(12) United States Patent　　　(10) Patent No.: US 12,615,132 B2
Boutillon et al.　　　　　　　　　(45) Date of Patent: Apr. 28, 2026

(54) METHOD FOR A TRANSMITTER TO TRANSMIT A SIGNAL TO A RECEIVER IN A COMMUNICATION SYSTEM, AND CORRESPONDING RECEIVING METHOD, TRANSMITTER, RECEIVER AND COMPUTER PROGRAM

(71) Applicant: UNIVERSITE DE BRETAGNE SUD, Lorient (FR)

(72) Inventors: Emmanuel Boutillon, Lorient (FR); Kassem Saied, Lorient (FR)

(73) Assignee: UNIVERSITE DE BRETAGNE SUD, Lorient (FR)

( * ) Notice: Subject to any disclaimer, the term of this patent is extended or adjusted under 35 U.S.C. 154(b) by 104 days.

(21) Appl. No.: 18/698,558

(22) PCT Filed: Oct. 3, 2022

(86) PCT No.: PCT/EP2022/077432
§ 371 (c)(1),
(2) Date: Apr. 4, 2024

(87) PCT Pub. No.: WO2023/057366
PCT Pub. Date: Apr. 13, 2023

(65) Prior Publication Data
US 2024/0413965 A1　　Dec. 12, 2024

(30) Foreign Application Priority Data

Oct. 8, 2021　(EP) ..................................... 21306419

(51) Int. Cl.
*H04L 7/04*　　　　(2006.01)
*H04B 1/707*　　　(2011.01)
(Continued)

(52) U.S. Cl.
CPC ............. *H04L 7/048* (2013.01); *H04B 1/707* (2013.01); *H04L 1/0058* (2013.01); *H04L 27/2035* (2013.01)

(58) Field of Classification Search
CPC ....... H04B 1/7073; H04B 1/707; H04L 7/048; H04L 1/0058; H04L 27/2035; Y02D 30/70; H04J 13/0062; H04J 13/0074
See application file for complete search history.

(56) References Cited

U.S. PATENT DOCUMENTS 11,012,091 B2 *　5/2021　Kobayashi ......... H03M 13/1154
11,997,030 B2 *　5/2024　Yang ................... H04J 13/0074
(Continued)

OTHER PUBLICATIONS

International Search Report dated Jan. 20, 2023 for corresponding International Application No. PCT/EP2022/077432, filed Oct. 3, 2022.

(Continued)

*Primary Examiner* — Dac V Ha
(74) *Attorney, Agent, or Firm* — David D. Brush; Westman, Champlin & Koehler, P.A.

(57)　　　　　ABSTRACT

A method for a transmitter to transmit a signal to a receiver in a communication system. The method includes: generating at least one spread frame having N spread symbols, obtained by mapping N encoded symbols onto N cyclically shifted versions of a given base sequence, with N≥2; and generating at least one overmodulated frame by modulating the at least one spread frame comprising N spread symbols by an overmodulation sequence of size N.

15 Claims, 5 Drawing Sheets

(51) Int. Cl.
    H04L 1/00        (2006.01)
    H04L 27/20      (2006.01)

(56)            References Cited

U.S. PATENT DOCUMENTS 12,218,686 B2 *    2/2025   Li  ........................ H03M 13/116
2009/0254794 A1    10/2009   Malik et al.

OTHER PUBLICATIONS

Written Opinion of the International Searching Authority dated Jan. 20, 2023 for corresponding International Application No. PCT/EP2022/077432, filed Oct. 3, 2022.
Saieda, K. et al., "Quasi Cyclic Short Packet for Asynchronous Preamble-Less Transmission in Very Low SNRS," Jun. 30, 2020 (Jun. 30, 2020), hal-02884668, XP002806028.
Imad, R. et al., "Blind frame synchronization and phase offset estimation for coded systems," 9th SPAWC conference : IEEE international workshop on signal processing advances in wireless communications, Submitted May 20, 2019, Recife, Brazil, hal-02134558.
Imad, R. et al. "Frame Synchronization Techniques for non-binary LDPC Codes over GF(q)," ResearchGate Conference Paper, DOI: 10.1109/GLOCOM.2010.5683422 • Source: IEEE Xplore, Jan. 2011, pp. 1-6.
Zhang, X. et al., "Low-complexity reliability-based message-passing decoder architectures for non-binary LDPC codes," IEEE Transactions on Very Large Scale Integration (VLSI) Systems, vol. 20, No. 11, pp. 1938-1950, Nov. 2012.
Kao, C. et al., "Performance analysis and simulation of cyclic code-shift keying," Military Communications Conference, (MILCOM 2008) IEEE, Nov. 2008, pp. 1-6.
Dillard, G. et al., "Cyclic code shift keying: a low probability of intercept communication technique" IEEE Transactions on Aerospace and Electronic Systems, vol. 39, No. 3, Jul. 2003.
Extended European Search Report dated Apr. 7, 2022, for corresponding European Application No. 21306419.9, filed Oct. 8, 2021.
Saied, K. et al., "Time-Synchronization of CCSK Short Frames," 2021 17th International Conference on Wireless and Mobile Computing, Networking and Communications (WIMOB), IEEE, Oct. 11, 2021 (Oct. 11, 2021), pp. 307-312, XP034027218, DOI: 10.1109/WiMob52687.2021.9606328.

* cited by examiner

METHOD FOR A TRANSMITTER TO TRANSMIT A SIGNAL TO A RECEIVER IN A COMMUNICATION SYSTEM, AND CORRESPONDING RECEIVING METHOD, TRANSMITTER, RECEIVER AND COMPUTER PROGRAM

CROSS-REFERENCE TO RELATED APPLICATIONS

This Application is a Section 371 National Stage Application of International Application No. PCT/EP2022/077432, filed Oct. 3, 2022, and published as WO 2023/057366 A1 on Apr. 13, 2023, in English, which claims priority to European Patent Application No. 21306419.9, filed Oct. 8, 2021, the contents of which are hereby incorporated by references in their entireties.

1. FIELD OF THE DISCLOSURE

The field of the disclosure is that of digital communications.

In particular, the disclosure provides new techniques for transmitting and receiving a signal in a communication system, in which the communication channel can affect the transmitted signal by an unknown delay and/or noise.

For instance, the invention finds applications in the field of wireless (for example on audio waves, radio waves, mechanical waves, unguided optic waves, etc.) or wired (for example electrical wire, optical fiber, etc.) communications. In particular, the invention can be used in IoT-based applications ("Internet of Things").

2. BACKGROUND

IoT-based applications can be segmented into two categories: "critical" applications (traffic safety, automated vehicles . . . ) and "massive" applications (smart buildings, transport logistics . . . ).

Massive applications are characterized by a high density of connected devices, small data payloads, as well as stringent constraints on the device energy consumption and cost. Maximizing the efficiency of an IoT network is thus a key pre-requisite for providing massive connectivity. At link level, it could take advantage of powerful error control codes such as Non-binary (NB) codes. At system level, "meta data" throughput, i.e., exchange of information linked to signaling, synchronization and identification should be reduced.

For IoT-based application, and more generally for short data packets transmission, it is thus desirable to remove, or at least shorten, the header used for the synchronization at the receiver, in order to maximize the efficiency of the communication system.

However, a transmission frame is usually composed of a payload, some redundancy to correct transmission errors, and metadata known at the receiver to help the synchronization task. In short packet transmission, the payload is shortened and started to be comparable in size to the data used for detection and synchronization tasks. Therefore, this synchronization data cost is no longer negligible, and new efficient framing techniques are required.

Various techniques have been proposed to solve the frame detection and synchronization problem based on the transmission of a preamble for each frame. This traditional preamble-based method permits high simplification of the receiver complexity, thanks to known received information.

However, use of a preamble leads to an occupation of a significant part of the bandwidth, mainly when the message payload is small.

Preamble-less techniques have also been proposed for short packets transmission, but have proven their efficiency on positive decibel SNR values only (i.e., SNR>0 dB).

Document "Quasi Cyclic Short Packet for asynchronous preamble-less transmission in very low SNRs" (K. Saied, A. C. A. Ghouwayel, E. Boutillon, hal-02884668) discloses a preamble-less technique efficient at very low SNR (from −30 dB to −5 dB), that can be used for short packets transmission.

Such technique relies on a new frame structure for transmission of short packets, called QCSP for "Quasi Cyclic Short Packet". A QCSP frame relies on the combination of CCSK ("Cyclic Code Shift Keying") modulation and non-binary error control codes.

FIG. 1 illustrates the CCSK-based system model proposed in the document "Quasi Cyclic Short Packet for asynchronous preamble-less transmission in very low SNRs".

At the transmitter side, we consider a non-binary (NB) code defined over the Galois field with q elements, denoted by GF(q). The input of the non-binary encoder 11 is a binary message M of size m=K×p information bits, equivalently K GF(q) symbols. The NB-encoder 11 generates a codeword C of size N GF(q) symbols, i.e. $C=[c_0, c_1, \ldots, c_{N-1}]$, with $c_k \in GF(q)$, $k=0, 1, \ldots, N-1$. Let H be the parity check matrix associated to the NB code, then the codeword C verifies $HC^T=0$, where $C^T$ is the transpose of C.

The CCSK modulation 12 uses a pseudorandom binary sequence $P_0=\{P_0(i)\}_{i=0, \ldots, q-1}$ of length q, where $P_0(i) \in \{0, 1\}$. The CCSK modulation 12 maps an element $c_k$ of GF(q) to the sequence $P_{c_k}$ defined as the circular right shift of $P_0$ by $c_k$ positions, i.e., $P_{c_k}=\{P_0(i-c_k \bmod q)\}_{i=0, \ldots, q-1}$. The CCSK frame $F_{CCSK}$ is thus defined as the concatenation of N CCSK symbols, i.e., $F_{CCSK}=[P_{c_0}, P_{c_1}, \ldots, P_{c_{N-1}}]$.

A BPSK modulation 13 ("binary phase shift keying") can be implemented to convert $P_0(i) \in \{0,1\}$ into $P'_0(i) \in \{-1,1\}$ before transmission. Before transmission, the generated QCSP frame F is composed of N×q BPSK symbols. It is then shaped by a half-raised cosine filter, for example with a roll-off factor equal to 0.35.

The digital signal can be converted to an analog signal in the DAC 14 ("Digital to Analog Converter") and transmitted through a transmission channel 15.

For example, we assume a low-cost sensor that sporadically transmits/receives small messages in an ALOHA protocol, i.e. without prior time and frequency synchronization at the receiver. The model of the channel is given at chip level in the sequel. The message transmitted in a QCSP frame is thus received with an unknown time offset $n_0$ (where $n_0$ encompasses both the exact time of emission and time of propagation between the transmitter and the receiver). The message is also affected by an unknown (but limited) frequency offset $f_0$ and an initial phase offset $\phi_0 \in [0,2\pi]$:

$$y(n) = e^{j(2\pi f_0(n-n_0)+\phi_0)}F(n-n_0) + z(n) \qquad (1)$$

with:

$$F(n-n_0) = 0 \text{ when } n-n_0 \notin 0, [\![Nq-1]\!].$$

$f_0$ and $\phi_0$ are supposed to be uniformly distributed in their respective interval ranges without any prior information, z(n) are realizations of an Additive White Gaussian Noise (AWGN) $\mathcal{N}(\mu, \sigma)$, with $\mu=0$ and standard deviation $$\sigma = \sqrt{\frac{10^{-SNR/10}}{2}},$$

SNR represents the signal-to-noise ratio of the transmission.

The whole received frame will be denoted by Y.

At the receiver side, the analog signal is converted to a digital signal in the ADC 16 ("Analog to Digital Converter").

From the CCSK and NB-Code association, the demapping (i.e., demodulation) process is simple if a frame is correctly detected. The input of a NB decoder 19 can be given as the vector of log-likelihood values obtained in block 18:

$$L = \left\{ L(c_k) \triangleq \log(\mathcal{P}(P_{c_k} | Y)) \right\}_{c_k = 0, 1, \dots, q-1},$$

where Y is a block of length q of the received message y that passes through Gaussian channel, and $\mathcal{P}$ is the probability that the transmitted sequence is $P_{c_k}$ given that the received block message is Y.

In the document "Quasi Cyclic Short Packet for asynchronous preamble-less transmission in very low SNRs", a frame detector 17 has been proposed in order to detect a frame based on the observation of N×q received samples.

Such frame detector 17 is based on a score function $SC_n$ indicating the detection of a newly arrived frame at a given time n when a predefined threshold is attained. The output of the detection process is thus an estimate of the time of arrival $n_a$ of the frame and a coarse estimate of the frequency offset $f_c$. The coarse frequency offset estimation can be used to compensate the input signal frequency offset, giving after correction a residual frequency offset $f_r = f_0 - f_c$.

Let n be an integer index. The correlation $L_n(i)$ between the vector $$y_n = (y(n), y(n+1), \dots, y(n+q-1))$$

and the $i^{th}$ CCSK sequence $P_i$ is defined as:

$$L_n(i) = \sum_{l=0}^{q-1} y(n+l) P_i(l) \tag{2}$$

The non-coherent CCSK demodulation of the vector $y_n$ consists in maximizing the absolute value of the correlation $L_n(i)$. Let $d_n$ be the hard decision of the non-coherent demodulation process, $d_n$ is defined as:

$$d_n = \underset{i=0,1,\dots,q-1}{\mathrm{argmax}} \{|L_n(i)|\} \tag{3}$$

From $d_n$, we can define the corresponding correlation value as:

$$\gamma_n = L_n(d_n) \tag{4}$$

and one should note that, by construction, $|\gamma_n| = \max(|L_n|)$. Thus, the detection score function $SC_n(Y)$ can be defined as:

$$SC_n(Y) = \sum_{k=0}^{N-1} |\gamma_{n+kq}| \tag{5}$$

However, at low SNR, for example −10 dB, the maximum of the score function is not reached at time $n_a=0$, which corresponds to the exact time of arrival. As a consequence, some frames are not correctly synchronized at the receiver side.

There is thus still a need for further improving the detection and synchronization of the received frames, especially at low SNR.

3. SUMMARY OF THE INVENTION

According to at least one embodiment, the disclosure provides a method for a transmitter to transmit a signal to a receiver in a communication system, comprising:

generating at least one spread frame comprising N spread symbols, obtained by mapping N encoded symbols onto N cyclically shifted versions of a given base sequence, with N≥2, generating at least one overmodulated frame by modulating said at least one spread frame comprising N spread symbols by an overmodulation sequence of size N.

In this way, N encoded symbols are first modulated according to a spread spectrum technique, delivering N spread symbols. To do so, each encoded symbol is mapped onto a cyclically shifted version of the base sequence. The base sequence is for example a pseudo-random sequence.

An overmodulation sequence is then applied on the N spread symbols forming a spread frame, delivering an overmodulated frame. For example, the spread symbols of the spread frame are multiplied term by term by the overmodulation symbols of the overmodulation sequence, or by overmodulation symbols after transformation. As the overmodulation sequence is used to modulate the N spread symbols, it can not be a constant sequence. In other words, at least two overmodulation symbols of the overmodulation sequence have distinct values.

Overmodulated frames are then transmitted instead of spread frames.

Thanks to the use of an overmodulation sequence, a receiver receiving at least one overmodulated frame could detect the beginning of the overmodulated frame at symbol level, which is the same as the beginning of the spread frame, even in a very noisy environment (i.e., very low SNR).

An overmodulated frame can thus be considered as a preamble sequence to perform detection and synchronization, and/or an encoded payload to be decoded. Thanks to this structure, overmodulated frame offers the capability of blind detection and self-synchronization without additional overhead.

According to at least one embodiment, generating at least one spread frame implements a Cyclic Code Shift Keying modulation.

According to this embodiment, the spread symbols are CCSK symbols and the spread frame is a concatenation of N CCSK symbols.

According to at least one embodiment, generating at least one overmodulated frame modulates the phase of the N spread symbols of said at least one spread frame.

According to this embodiment, the N spread symbols forming a spread frame (for example the N CCSK symbols forming a CCSK frame) are each modulated by an over-modulated symbol of the overmodulated sequence of size N, on a term-by-term basis.

The overmodulation thus generates a pre-defined phase pattern within the sequence of spread symbols to transmit.

With this additional modulation, the phase of the maximum values found at the output of the correlation block at the receiver can be used to determine the exact window of arrival of the incoming frame.

According to at least one embodiment, said overmodulation sequence is:

$$B = [b_0, b_1, \ldots, b_{N-1}]$$

and said at least one overmodulated frame is:

$$F = \left[ b_0 \oplus P_{c_0}, b_1 \oplus P_{c_1}, \ldots, b_{N-1} \oplus P_{c_{N-1}} \right]$$

with:

$b_k \in \{0,1\}$, $[P_{c_0}, P_{c_1}, \ldots, P_{c_{N-1}}]$ the N spread symbols of said at least one spread frame and $\oplus$ the exclusive "or".

The overmodulated frame (i.e., the overmodulation sequence B and the spread symbols) can be modulated by a binary phase shift keying modulation before transmission.

In this case, the modulated version of the overmodulated frame can be expressed as:

$$F' = \left[ (-1)^{b_0} P'_{c_0}, (-1)^{b_1} P'_{c_1}, \ldots, (-1)^{b_{N-1}} P'_{c_{N-1}} \right]$$

with:

$$P'_{c_k} = \left\{ P'_0(i - c_k \bmod q) \right\}_{i=0,\ldots,q-1}$$

$$P'_0(i) \in \{-1, 1\}.$$

In this way, the overmodulation generates a known sequence of ±1, where 1 gives no phase change to a spread symbol and −1 gives a π rotation to a spread symbol, within the sequence of spread symbols to transmit.

For example, said overmodulation sequence belongs to the group comprising:

CAZAC sequence ("Constant Amplitude Zero Autocorrelation"), for example Zadoff-Chu sequence, a Barker sequence.

In at least one embodiment, the overmodulation sequence has good auto-correlation properties. In other words, the correlation of the same version of the overmodulation sequence is above a first threshold, whereas the correlation of cyclically shifted versions of the overmodulation sequence is below a second threshold and neglectable (the first threshold being greater than the second threshold).

According to at least one embodiment, said encoded symbols are non-binary symbols.

According to this embodiment, error control codes such as non-binary codes are implemented at the transmitter, in order to further improve the time synchronization of the received frames. In particular, properties of the binary codes can be used at the receiver to improve the synchronization at the chip level, when a CCSK modulation is implemented at the transmitter.

The disclosure also pertains to a method for a receiver to receive a signal transmitted by a transmitter in a communication system, comprising:

receiving at least one overmodulated frame, said at least one overmodulated frame being generated at the transmitter by modulating at least one spread frame, comprising N spread symbols, by an overmodulation sequence of size N, the N spread symbols of said at least one spread frame being obtained at the transmitter by mapping N encoded symbols onto N cyclically shifted versions of a given base sequence, with N≥2, determining a second estimate of a time of arrival at the receiver of said at least one spread frame, from a first estimate of said time of arrival and said overmodulation sequence.

Such reception method can be implemented for the synchronization of a signal transmitted according to the transmission method described above.

In particular, a first estimate of a time of arrival at the receiver of a spread frame can be first obtained. The first estimate can be determined using any known technique, such as for example the one disclosed in previously cited document "Quasi Cyclic Short Packet for asynchronous preamble-less transmission in very low SNRs". The first estimate can be a coarse estimate of the time of arrival of a spread frame. In another embodiment, a hypothesis can be made on the first estimate. Such first estimate can be refined, at least at the symbol level, thanks to the overmodulation sequence.

Indeed, the modulated version of the overmodulated frame comprises a pre-defined phase pattern, for example a known sequence of ±1, where 1 gives no phase change to a spread symbol, and −1 gives a π rotation to a spread symbol. This phase pattern is expected to be recovered even when a residual frequency offset causes a rotational effect on the spread symbols being decoded.

According to at least one embodiment, determining a second estimate of said time of arrival, denoted $\tilde{n}_0$, comprises determining an estimate of a symbol synchronization error, denoted $\tilde{s}$, such as:

$$\tilde{n}_0 = n_a + \tilde{s}T$$

with:

$n_a$ the first estimate of said time of arrival, and

T the time duration of the base sequence.

For example, the time duration of the base sequence can be the number of chips of the base sequence if a CCSK modulation is implemented at the transmitter.

According to this embodiment, only synchronization errors at the symbol level can be compensated.

According to at least one embodiment, the estimate s̃ of the symbol synchronization error is determined as:

$$\tilde{s} = \underset{s \in \llbracket -S,S \rrbracket}{\operatorname{argmax}} \left\{ \max\left\{ \left| FFT\left( \Gamma_{n_a+sT} \odot B' \right) \right| \right\} \right\}$$

with:

B' a modulated version of the overmodulation sequence, $$\Gamma_n = (\gamma_n, \gamma_{n+q}, \gamma_{n+q(N-1)}),$$

$\gamma_n$ the correlation factor with the highest absolute value between the received spread symbol indexed n and the set of all possible cyclically shifted versions of the base sequence, and $0 < S \leq N/2$.

A value of $$S = \frac{N}{2}$$

guarantees an exhaustive exploration of all possible symbol synchronization errors, at a cost of a test of N hypothesis. The value of S can be reduced (typically $$S = \frac{N}{4} \text{ or } S = \frac{N}{8})$$

without affecting synchronization performance.

According to another embodiment the estimate s̃ of the symbol synchronization error is determined as:

$$\tilde{s} = \underset{s \in \llbracket -S,S \rrbracket}{\operatorname{argmax}} \left\{ \max\left\{ \left| FFT\left( A_{n_a+sq} \odot \Gamma_{n_a+sT} \odot B' \right) \right| \right\} \right\}$$

with:

B' a modulated version of the overmodulation sequence, $$\Gamma_n = (\gamma_n, \gamma_{n+q}, \gamma_{n+q(N-1)}),$$

$\gamma_n$ the correlation factor with the highest absolute value between the received spread symbol indexed n and the set of all possible cyclically shifted versions of the base sequence, $$A_n = (\alpha_n, \alpha_{n+q}, \alpha_{n+q(N-1)}),$$

$\alpha_n$ a weighting factor, and
$0 < S \leq N/2$.

According to at least one embodiment, determining a second estimate of said time of arrival further comprises determining an estimate of a chip synchronization error, denoted r̃, such as:

8

$$\tilde{n}_0 = n_a + \tilde{s}T + \tilde{r}$$

According to this embodiment, both synchronization errors at the symbol level and at the chip level can be compensated when a CCSK modulation is implemented at the transmitter.

According to at least one embodiment, said encoded symbols are non-binary symbols and the estimate r̃ of the chip synchronization error is determined from messages sent from at least one non-binary constraint node to a non-binary variable node in a step for decoding the encoded symbols.

Properties of the binary codes can thus be used at the receiver to improve the time synchronization at the chip level.

The disclosure also relates to a corresponding transmitter for transmitting a signal to a receiver in a communication system, comprising at least one processor configured to:

generate at least one spread frame comprising N spread symbols, obtained by mapping N encoded symbols onto N cyclically shifted versions of a given base sequence, with N≥2, generating at least one overmodulated frame by modulating said at least one spread frame comprising N spread symbols by an overmodulation sequence of size N.

Such a transmitter is in particular adapted to implement the transmission method described above. It could of course include the various features relating to the transmission method according to the invention, which can be combined or taken in isolation. Thus, the features and advantages of this transmitter are the same as those of the method described above. Therefore, they are not further detailed.

The disclosure also pertains to a corresponding receiver for receiving a signal transmitted by a transmitter in a communication system, comprising at least one processor configured to:

receive at least one overmodulated frame, said at least one overmodulated frame being generated at the transmitter by modulating at least one spread frame, comprising N spread symbols, by an overmodulation sequence of size N, the N spread symbols of said at least one spread frame being obtained at the transmitter by mapping N encoded symbols onto N cyclically shifted versions of a given base sequence, with N≥2, determine a second estimate of a time of arrival at the receiver of said at least one spread frame, from a first estimate of said time of arrival and said overmodulation sequence.

Such a receiver is in particular adapted to implement the reception method described above. It could of course include the various features relating to the reception method according to the invention, which can be combined or taken in isolation. Thus, the features and advantages of this receiver are the same as those of the method described above. Therefore, they are not further detailed.

The invention also relates to one or more computer programs including instructions for the implementation of a transmission method and/or a receiving method as described above when this or these programs are executed by at least one processor.

The invention also relates to an information medium readable by a computer, and including instructions of a computer program as mentioned above.

4. LIST OF FIGURES

Other features and advantages of the invention will emerge more clearly upon reading the following description of a particular embodiment, given by way of simple illustrative and non-limiting example, and the appended drawings, among which:

FIG. 1 illustrates a CCSK-based system model of the prior art;

FIG. 2 presents the main steps of the transmission method according to at least one embodiment;

FIG. 3 presents the main steps of the reception method according to at least one embodiment;

5. DESCRIPTION OF AT LEAST ONE EMBODIMENT

5.1 General Principal

The general principal of the disclosure is to overmodulate a frame of spread symbols, using an overmodulation sequence (i.e. a non-constant sequence). According to at least one embodiment, the overmodulation sequence has specific auto-correlation properties, in order to improve the time synchronization at the symbol level at the receiver.

Figures 1, 2:
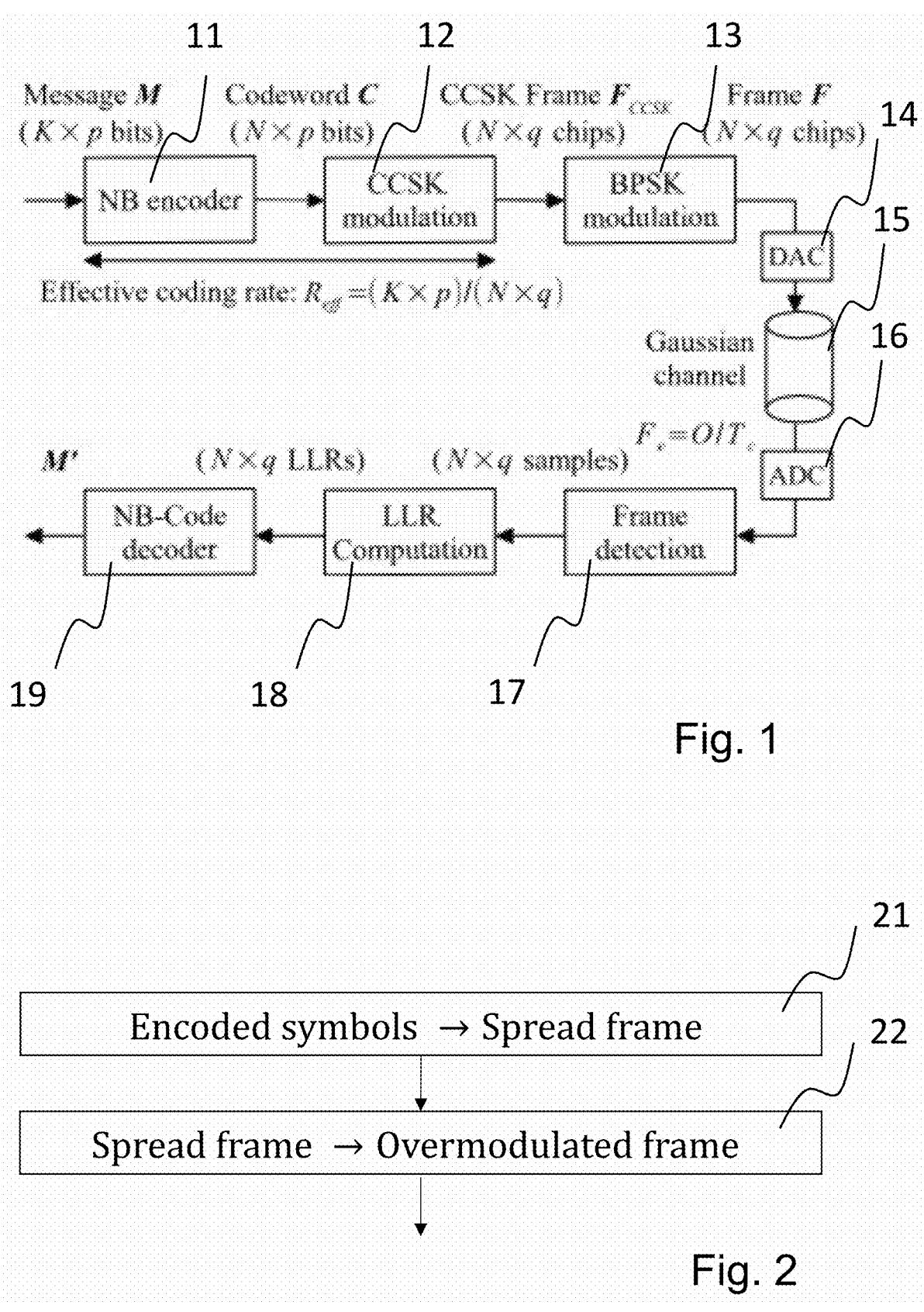

FIG. 2 illustrates the main steps of the transmission method according to at least one embodiment.

In a first step 21, N encoded symbols are mapped onto N spread symbols. The N spread symbols comprise a given base sequence and N−1 cyclically shifted versions of said base sequence, with N≥2. Each encoded symbol is thus mapped on a different version of the same base sequence.

The base sequence can be a pseudo-random binary sequence.

The encoded symbols could be binary or non-binary symbols. In other words, the encoded symbols could belong to a set of cardinalities q≥2, for example the Galois field GF(q). If q>2, non-binary codes can be NB-Low Density Parity Check (NB-LDPC) codes, NB-Turbo, NB Turbo Product Codes, or NB-Polar codes for example.

If no encoding is implemented at the transmitter, the encoded symbols can be source symbols. If encoding is implemented at the transmitter, the encoded symbols form a codeword C.

The N spread symbols can be concatenated to form a spread frame.

For example, step 21 implements a CCSK modulation on the encoded symbols, using a binary pseudo random sequence as base sequence.

In a second step 22, at least one spread frame (each spread frame comprising N spread symbols) is overmodulated by an overmodulation sequence of size N. Such overmodulation sequence can be a binary sequence.

For example, step 22 implements a phase modulation on the spread symbols, using a binary sequence with good auto-correlation properties as overmodulation sequence.

Each of the N spread symbols of a spread frame are thus modulated by an overmodulation symbol of the overmodulation sequence, to modify the phase of the spread symbols and generate an overmodulated frame.

The overmodulated frame (i.e., the overmodulation sequence B and the spread symbols) can be modulated by a binary phase shift keying modulation before transmission.

Examples of base sequences and overmodulation sequences are given in Appendix 1.

The overmodulated frame can be transmitted to the receiver through a communication channel.

Figures 3, 4:
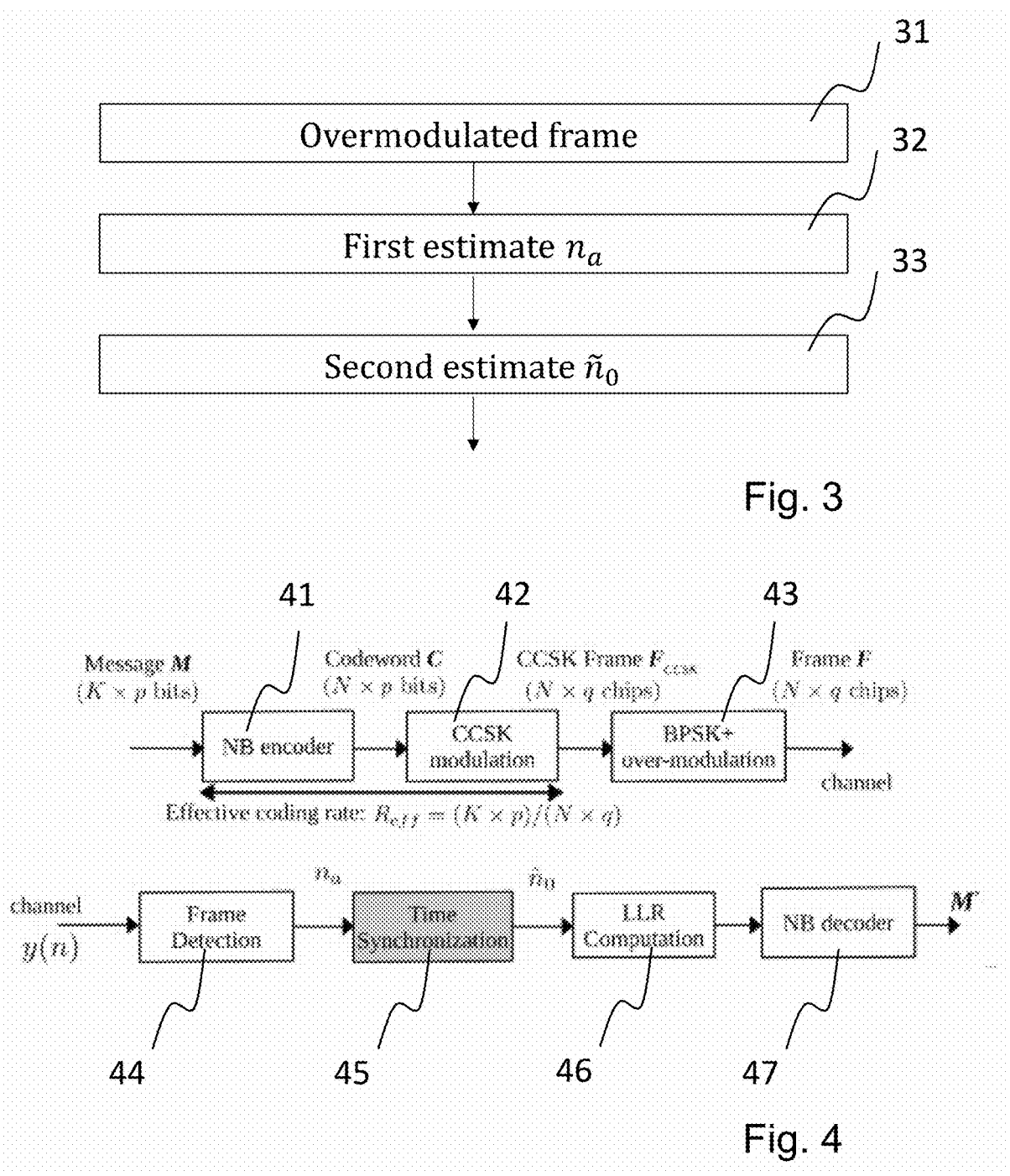
FIG. 4 illustrates a communication system according to a specific embodiment.

FIG. 3 illustrate the main steps of the reception according to at least one embodiment.

In a first step 31, at least one overmodulated frame is obtained by the receiver.

In a second step 32, a first estimate $n_a$ of a time of arrival at the receiver of at least one spread frame can be obtained. As the overmodulated frame is the same as the spread frame except for the phase change of the spread symbols, the time of arrival of the spread frame is the same as the time of arrival of the overmodulated frame. The first estimate can be a coarse estimate, determined using any known technique or based on a hypothesis.

In a third step 33, a second estimate $\tilde{n}_0$ of the time of arrival of said at least one spread frame is determined from said first estimate and said overmodulation sequence. The second estimate can be a fine estimate.

According to at least one embodiment, determining the second estimate $\tilde{n}_0$ comprises determining an estimate of a symbol synchronization error, denoted s, such as:

$$\tilde{n}_0 = n_a + \tilde{s}T$$

with T the time duration of the base sequence (for example T=q the number of chips of the base sequence when a CCSK modulation is implemented at the transmitter).

According to at least one embodiment, determining the second estimate $\tilde{n}_0$ further comprises determining an estimate of a chip synchronization error, denoted $\tilde{r}$. In this case, the second estimate is denoted $\hat{n}_0$, such as:

$$\hat{n}_0 = n_a + \tilde{s}T + \tilde{r}$$

Indeed, the inventors have found that at low SNR, the time synchronization error can be the sum of two events: symbol synchronization errors and chip synchronization error. A two-step time synchronization algorithm is thus proposed to first compensate the symbol synchronization errors at the symbol level using an overmodulation sequence at the transmitter, and possibly to compensate the chip synchronization error at the chip level using the code structure, especially when a non-binary encoder and a CCSK modulation are used at the transmitter.

5.2 Time Synchronization of CCSK Short Frame

We describe hereafter an example of a method for transmitting and receiving a signal according to at least one embodiment, where the spread symbols are obtained using a Cyclic Code Shift Keying modulation scheme. However, as already mentioned, the disclosure is not limited to this kind of modulation, and any spread spectrum technique enabling to spread or extend the encoded symbols can be used. More generally, any time function $f(t)$ over the time interval [0, T] that is not constant (for example that possesses good autocorrelation properties) can be used.

In addition, we consider that the encoded symbols are obtained using a non-binary encoder, for example a LDPC non-binary encoder. Once again, the disclosure is not limited to this kind of encoding, and other non-binary codes (for example NB turbo codes, NP Polar codes, etc), or binary codes, or even no encoding at all, could also be used.

We also consider a two-step time synchronization algorithm. In the first step, an overmodulation aided symbol synchronization process is proposed to suppress the time ambiguity at the symbol level (from $n_a$ to $ñ_0$). Then, in the second step, which is optional, a coded-aided process mitigates the time chip ambiguity (from $ñ_0$ to $n̂_0$), leading to the final time synchronization considered to be exact with a high probability.

The input of the time synchronization algorithm implemented at the receiver is a set of 2N received samples that are assumed to contain a CCSK frame, as well as the first coarse time estimation $n_a$. The output of the algorithm is the final estimation of the time of arrival (either $ñ_0$ if only the first step of the time synchronization algorithm is implemented, or $n̂_0$ if the two steps of the time synchronization algorithm are implemented).

The communication system according to this embodiment can be used to transmit short packets without any additional symbol dedicated to the function of detection and synchronization at ultra-low SNR, i.e., SNR<0 dB. This "preamble-less frame", also referred to as a Quasi-Cyclic Short Packet (QCSP) frame, is based on the use of a CCSK modulation scheme jointly associated with a non-binary (NB) forward error correction code defined over a Galois Field GF(q), where q>2. According to such embodiment, the proposed detection-synchronization algorithm will process the blocks of the received samples and compute the start of the frame with high accuracy at very low SNRs, based on the efficient matching between the CCSK modulation and the NB-LDPC coding for example.

FIG. 4 illustrates the communication system according to such embodiment.

At the transmitter side, non-binary encoding 41 and CCSK modulation 42 are implemented, in order to generate at least one spread frame comprising N spread symbols, denoted $F_{CCSK}$.

According to the illustrated embodiment, non-binary encoding 41 and CCSK modulation 42 can be similar to non-binary encoding 11 and CCSK modulation 12 disclosed in relation with FIG. 1, and are thus not described in more details here.

The CCSK frame $F_{CCSK}$ is thus defined as the concatenation of N CCSK symbols, i.e., $F_{CCSK}=[P_{c_0}, P_{c_1}, \ldots, P_{c_{N-1}}]$, with $P_{c_k}=\{P_0(i-c_k \mod q)\}_{i=0, \ldots, q-1}$ and $P_0=\{P_0(i)\}_{i=0, \ldots, q-1}$ the given base sequence, where $P_0(i) \in \{0, 1\}$. $P_0(i) \in \{0,1\}$ can be converted into $P'_0(i) \in \{-1,1\}$ using a binary phase shift keying modulation before transmission.

According to the disclosure, at least one overmodulated frame, also called QCSP frame or frame F, is generated using an overmodulation (OM) sequence at the transmitter side. More specifically, at step 43, the CCSK frame $F_{CCSK}$ is overmodulated by an overmodulation sequence of size N in order to enhance the synchronization process after the reception of the frame, without affecting the overall coding rate.

In other words, such overmodulation sequence is added to the CCSK symbols to help determining when the CCSK frame starts, at the symbol level, especially in a very noisy environment.

According to at least one embodiment, the overmodulation sequence has good auto-correlation properties. The correlation of the same version of the overmodulation sequence is thus above a first threshold, whereas the correlation of cyclically shifted versions of the overmodulation sequence is below a second threshold and neglectable (with the first threshold greater than the second threshold). For example, the overmodulation sequence is a binary sequence $B=[b_0, b_1, \ldots, b_{N-1}]$, with $b_k \in \{0,1\}$, and the overmodulated frame is:

$$F = \left[ b_0 \oplus P_{c_0}, b_1 \oplus P_{c_1}, \ldots, b_{N-1} \oplus P_{c_{N-1}} \right] \tag{6}$$

The overmodulation sequence can also be a Barker sequence or a CAZAC sequence (for example a Zadoff-Chu sequence).

The overmodulated frame (i.e., the overmodulation sequence B and the spread symbols) can be modulated by a binary phase shift keying modulation before transmission.

In this case, the modulated version of the overmodulated frame can be expressed as:

$$F' = \left[ (-1)^{b_0} P'_{c_0}, (-1)^{b_1} P'_{c_1}, \ldots, (-1)^{b_{N-1}} P'_{c_{N-1}} \right]$$

with:

$$P'_{c_k} = \{P'_0(i - c_k \bmod q)\}_{i=0, \ldots, q-1}$$

$$P'_0(i) \in \{-1, 1\}.$$

As already mentioned, the modulated version of the overmodulated frame thus comprises a known sequence of ±1 where 1 gives no phase change to a spread symbol and −1 gives a $\pi$ rotation to a spread symbol, within the sequence of spread symbols to transmit. This phase pattern is expected to be recovered even when a residual frequency offset $f_r$ causes a rotational effect on the symbols being decoded.

According to the disclosure, instead of transmitting at least one CCSK frame $F_{CCSK}$, the transmitter transmits at least one overmodulated frame F such as defined before.

With this additional modulation according to the disclosure, the phase of the maximum values found at the output of the correlation block at the receiver can be used to determine the exact window of arrival of the incoming frame.

Before transmission, the overmodulated frame F is composed of N×q BPSK symbols. The overmodulated frame F is then shaped by a half-raised cosine filter with a roll-off factor for example equal to 0.35.

The model of the transmission channel can be similar to the one disclosed in relation with FIG. 1.

As already mentioned, the received message y(n) can be expressed as equation (1) disclosed in the prior art section:

$$y(n) = e^{j(2\pi f_0(n-n_0)+\phi_0)} F(n - n_0) + z(n) \tag{1}$$

A frame detection step 44 can be implemented to determine a first estimate $n_a$ of the time of arrival of the overmodulated frame F (equivalently the CCSK frame $F_{CCSK}$), based on the observation of N×q received samples. For example, the frame detector 44 is the one disclosed in the previously cited document "Quasi Cyclic Short Packet for asynchronous preamble-less transmission in very low SNRs".

According to the disclosure, a time synchronization algorithm is implemented in step 45 to determine a second estimate $ñ_0$ of the time of arrival of the overmodulated frame F (equivalently the CCSK frame $F_{CCSK}$), based on the first estimate $n_a$ and the overmodulation sequence. If the two steps of the time synchronization algorithm are implemented, the output of the time synchronization step 45 is $ñ_0$.

The residual frequency offset $f_r$ can be limited to a given interval. For example, the absolute phase offset between two chips can be bounded by $2\pi \times 10^{-3}$ radian. The frequency $f_0$ in equation (1) can thus be replaced by $f_r$ for the time synchronization task.

5.2.1 Symbol Synchronization

As disclosed in equation (4) in the prior art section, document "Quasi Cyclic Short Packet for asynchronous preamble-less transmission in very low SNRs" defines the corresponding correlation value as:

$$\gamma_n = L_n(d_n) \qquad (4)$$

The detection score function $SC_n(Y)$ can be defined as:

$$SC_n(Y) = \sum_{k=0}^{N-1} \frac{|\gamma_{n+kq}|}{\|y_{n+kq}\|_2}$$

where $\|y_u\|_2$ represents the 2-norm value of vector $y_u$.

The exact value of $\gamma_{n_0+kq}$ given in (4), with the hypothesis that the hard decision $d_{n_0+kq}$ given in equation (3) given in the prior art section is correct, i.e. $d_{n_0+kq} = c_k$, with $n_0$ the unknown time offset (where $n_0$ encompasses both the exact time of emission and time of propagation between the transmitter and the receiver), can be determined.

In that case, according to equation (2) disclosed in the prior art section:

$$\gamma_{n_0+kq} = \sum_{i=0}^{q-1} y(n_0 + kq + i) P_{c_k}(i) \qquad (7)$$

By replacing $y(n_0+kq+i)$ by its value given in (1), we have:

$$\gamma_{n_0+kq} = (-1)^{b_k} e^{j(2\pi f_r kq + \phi_0)} \sum_{i=0}^{q-1} e^{j2\pi f_r i} + Z_{n_0+kq} \qquad (8)$$

$$\gamma_{n_0+kq} = (-1)^{b_k} e^{j(2\pi f_r kq + \phi_0)} \frac{1 - e^{j2\pi f_r q}}{1 - e^{j2\pi f_r}} + Z_{n_0+kq}$$

$$\gamma_{n_0+kq} = (-1)^{b_k} e^{j(\omega k + \theta)} \frac{\sin(\pi f_r q)}{\sin(\pi f_r)} + Z_{n_0+kq}$$

with $\omega = 2\pi f_r q$ and $\theta = \phi_0 + 2\pi f_r(q-1)/2$.

One can note that if $|f_r q| \ll 1$, then $$\frac{\sin(\pi f_r q)}{\sin(\pi f_r)} \approx q$$

(between 63.56 and 64 for q=64 and $|f_r| \leq 10^{-3}$ for example).

Finally, $Z_{n_0+kq}$ represents a realization of a AWGN of zero mean and $\sqrt{q}\sigma$ as standard deviation.

Let us define the $\Gamma_{n_0}$ as $\Gamma_{n_0} = (\gamma_{n_0}, \gamma_{n_0+q}, \gamma_{n_0+q(N-1)})$.

In the absence of wrong decision, the term-by-term vector multiplication of $\Gamma_{n_0}$ and the modulated version B' of the overmodulation sequence B (i.e. the overmodulation sequence B after BSPK modulation for example) gives:

$$\Gamma_{n_0} \odot B' \approx q e^{j\theta}(1, e^{j\omega}, e^{j2\omega}, \dots, e^{j(N-1)\omega}) + Z_{n_0} \qquad (9)$$

with $Z_{n_0}$ a vector of N AWGN samples of zero mean and $\sqrt{q}\sigma$ standard deviation.

In summary, in the absence of wrong decision, $\Gamma_{n_0} \odot B'$ is a pure sinusoidal vector of length N and frequency ω affected by AWGN. This property is used to suppress time ambiguity at the symbol level. In fact, the initial time estimation $n_a$ (also known as first estimate) of $n_0$ is affected by s symbol synchronization errors and r chip synchronization errors. By neglecting the chip synchronization errors in this first step of the algorithm, we get $n_0 = n_a + sq$.

If $s \neq 0$, the vector $\Gamma_{n_a} \odot B'$ does not generate a pure sinusoidal of length N, but will include a sequence of N−s successive components of $(e^{jk\omega}(-1)^{b_k}(-1)^{b_{k-s}})_{k \in [\![max(0,s),min(N,N+s)]\!]}$ that contains no regular pattern, thanks to the choice of the overmodulation sequence B. It is thus possible to estimate the value of the symbol synchronization error s by selecting the value $\tilde{s}$ that makes the hypothesis "$\Gamma_{n_a+sq} \odot B'$ is a pure sinusoidal affected by noise" the more likely. This estimated value $\tilde{s}$ will give an updated version of the estimation of the arrival time $n_a$ (also known as second estimate) $ñ_0 = n_a + \tilde{s}q$.

According to a first embodiment, the value of the symbol synchronization error s that maximizes the maximum module of the Fast Fourier Transform of the $\Gamma_{n_a}(s) \odot B'$ vector can be selected.

In other words, according to this first embodiment, the ambiguity on symbol position is solved by taking $\tilde{s}$ as:

$$\tilde{s} = \underset{s \in [\![-S, S]\!]}{\text{argmax}} \{\max\{|FFT(\Gamma_{n_a+sq} \odot B')|\}\} \qquad (10)$$

with:
  B' a modulated version of the overmodulation sequence (i.e. sequence B after BPSK modulation),
  $\Gamma_n = (\gamma_n, \gamma_{n+q}, \gamma_{n+q(N-1)})$,
  $\gamma_n$ the correlation factor with the highest absolute value between the received spread symbol indexed n and the set of all possible cyclically shifted versions of the base sequence, and
  $0 < S \leq N/2$.

Such first embodiment can be called OverModulation (OM) algorithm.

This method is simple and suppresses the symbol ambiguity in the large majority of the cases.

According to a second embodiment, the values of $\gamma_s$ can be weighted by a coefficient that indicates the reliability of the decision. Let $$d_n^2$$

be the index of the second-highest decision in equation (2), and $$\epsilon_n = L_n(d_n^2),$$

i.e.:

$$d_n^2 = \underset{i = 0, 1, \ldots, q-1, i \neq d_n}{\mathrm{argmax}} \{|L_n(i)|\} \tag{11}$$

The relative ratio $\alpha_n$ between $|\gamma_n|$ and $|\epsilon_n|$, defined as $$\alpha_n = \frac{|\gamma_n| - |\epsilon_n|}{|\gamma_n|},$$

is a good indicator of the reliability of the decision. For example, $\alpha_n=0$ means that the decisions $d_n$ and $$d_n^2$$

have the same reliability, thus $d_n$ is not a reliable decision. On the contrary, $\alpha_n$ close to "1" indicates a very reliable decision. $\alpha_n$ can thus be considered as a weighing factor.

Let $A_n$ be the vector $A_n=(\alpha_n, \alpha_{n+q}, \alpha_{n+q(N-1)})$, the estimate $\tilde{s}$ of the symbol synchronization error according to this second embodiment is thus given as:

$$\tilde{s} = \underset{s \in [-S, S]}{\mathrm{argmax}} \{\max\{|FFT(A_{n_a+sq} \odot \Gamma_{n_a+sq} \odot B')|\}\} \tag{12}$$

with:
  B' the modulated version of the overmodulation sequence,
  $\Gamma_n=(\gamma_n, \gamma_{n+q}, \gamma_{n+q(N-1)})$, and
  $\gamma_n$ the correlation factor with the highest absolute value between the received spread symbol indexed n and the set of all possible cyclically shifted versions of the base sequence,
  $0<S\leq N/2$.

Such second embodiment can be called Weighted Over-Modulation (WOM) algorithm.

Figures 5, 6:
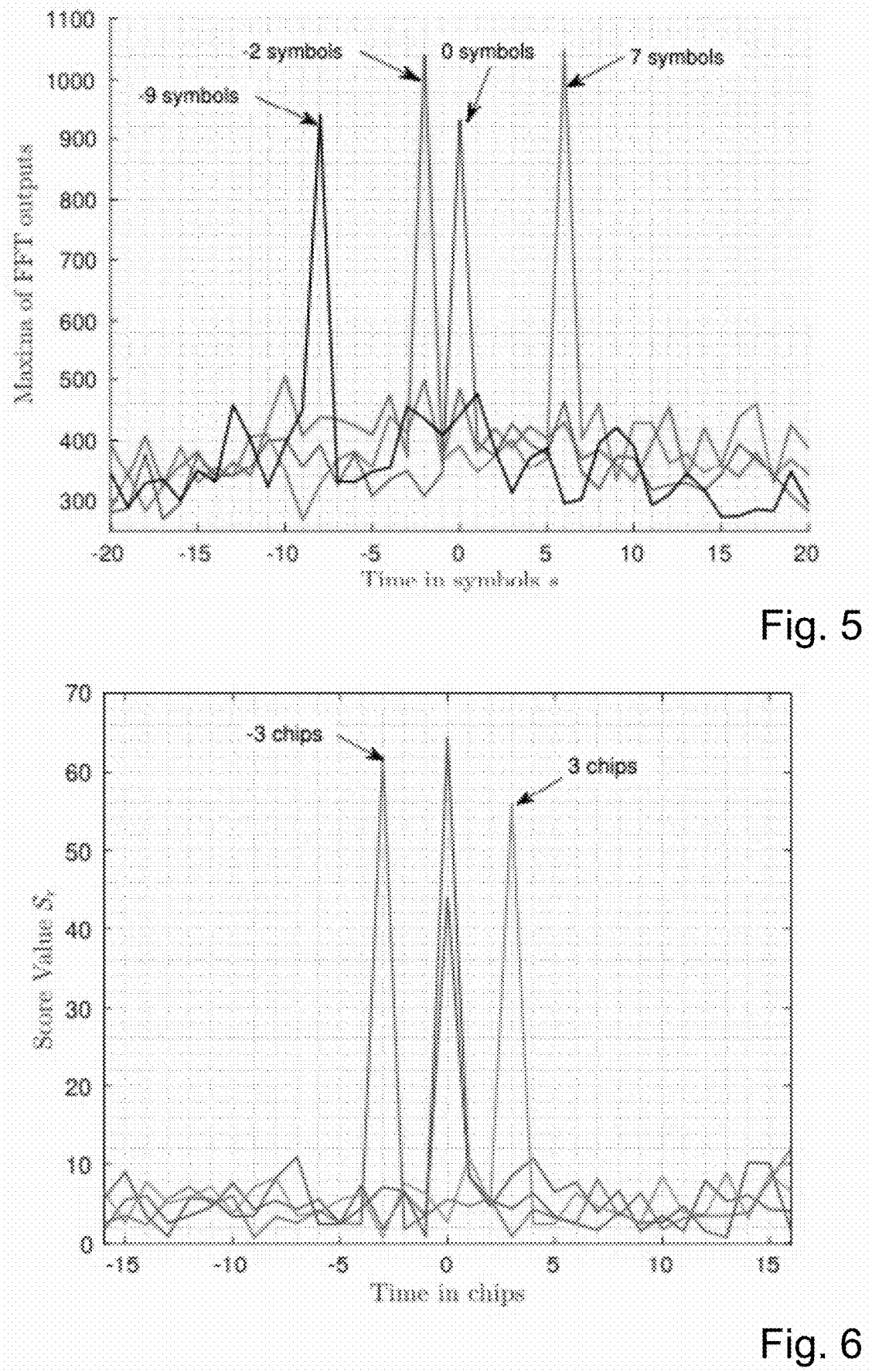
FIG. 5 shows examples of synchronization of different symbol offsets for different received frames.
FIG. 6 shows examples of synchronization of different chip offsets for different received frames.

FIG. 5 shows the value of $\max\{|FFT(A_{n_a+sq} \odot \Gamma_{n_a+sq} \odot B')|\}$ (equation (12)) where four received overmodulated frames are considered with N=64, q=64 at SNR of −10 dB. The initial coarse time estimations $n_a$ (first estimate) given by the detection algorithm of the frame detector 44 for the four frames are affected by a synchronization time error s×q with s=−9, 0, 2 and 7 respectively. In each case, equation (12) allows a correct estimation of the symbol synchronization error.

5.2.2 Chip Synchronization

In the first step of the time synchronization algorithm described above, we neglected the chip errors and consider that $n_0=n_a+sq$.

In order to further enhance the time synchronization, a second step of the time synchronization algorithm can be implemented. In this case, we consider that $n_0=n_a+sq+r$. The objective of the chip synchronization is to estimate the remaining chip errors $r=n_0-\tilde{n}_0$.

Two embodiments are disclosed below.

According to a first embodiment, a Syndrome-Based (SB) time synchronization is used on the proposed QCSP frame (overmodulated). Such Syndrome-Based time synchronization is based for example on the documents "Blind frame synchronization and phase offset estimation for coded systems (R. Imad and S. Houcke, in 2008 IEEE 9th Workshop on Signal Processing Advances in Wireless Communications, 2008, pp. 11-15) or in "Frame Synchronization Techniques for non-binary LDPC Codes over GF(q)" (R. Imad, C. Poulliat, and S. Houcke, January 2011, pp. 1-6).

According to a second embodiment, the SB time synchronization can be further improved by replacing the hard metric, which is the check node syndrome calculation, with a soft Variable Node-Based (VNB) metric.

As previously stated, we consider for example that the encoding step 41 implements a non-binary LDPC encoder.

Let us first describe some features of the NB-LDPC code defined by the parity check matrix H of N−K rows and N columns. The code is assumed to be regular, for example with weights $d_v=2$ columns and $d_c=3$ rows (code rate 1−2/3=1/3). Let $\mathcal{M}(j)$ be the set of the $d_c=3$ non-null positions of the $j^{th}$ row of H. The $j^{th}$ parity check equation for a vector X=(x(0), x(1), . . . x(N−1)) is defined as:

$$\sum_{i \in \mathcal{M}(j)} h(j, i)x(i) = 0 \tag{13}$$

Let us define $D_n=(d_n, d_{n+q}, \ldots, d_{n+(N-1)q})$.

In the absence of decoding error, $D_{n_0}$ is a codeword and thus, all the parity checks are fulfilled. If the number of detection errors is low enough, only a few parity checks will not be fulfilled. On the other side, if $n \neq n_0$, $D_n$ can be seen as a random vector, and thus, the number of non-verified parity checks will be in average close to N−K since each check node has one chance over q to be fulfilled.

Let us define $NoZ(D_n)$ (Number of Zero) the function that counts the number of satisfied parity checks.

According to the first embodiment (SB time synchronization), the remaining chip errors can be estimated using the syndrome-based aided chip synchronization, over multi hypotheses $r \in [-R, R]$, with $$0 < R \leq \frac{q}{8}:$$

as:

$$\hat{r} = \underset{r \in [-R, R]}{\mathrm{argmax}} \{NoZ(D_{\tilde{n}_0+r})\} \tag{14}$$

For example, R=1/2.

This method is efficient as long as the number of decoding errors is low enough.

According to the second embodiment (VNB), the SB method seen at the check node level can be replaced with a VNB method treating a "soft syndrome" seen at the variable node level, in particular if the number of decoding errors is not low enough. The idea is to perform one decoding iteration of the code with the hard decision vector $D_n$. This decoding iteration generates $d_v=2$ check to variable messages for each variable. The two messages $M_{j \to i}$ sent by checks $j \in \mathcal{N}(i)$ to variable i message can be defined as proposed in document "Low-complexity reliability-based message-passing decoder architectures for non-binary LDPC codes" (X. Zhang, F. Cai, and S. Lin, *IEEE Transactions on Very Large Scale Integration (VLSI) Systems*, vol. 20, no. 11, pp. 1938-1950, 2012):

$$M_{j \to i}(D_n) = h(j, i)^{-1} \sum_{i' \in M(j), i' \neq i} h(j, i') D_n(i') \qquad (15)$$

Let us defined $$D_n^2$$

as the decision vector of the second-highest reliable decision, i.e.

$$D_n^2 = \left( d_n^2, d_{n+q}^2, \dots, d_{n+(N-1)q}^2 \right)$$

with $$d_n^2$$

defined in equation (11).

Similarly, $$D_n^3$$

is defined as the decision vector of the third-highest reliable decision, i.e.

$$D_n^3 = \left( d_n^3, d_{n+q}^3, \dots, d_{n+(N-1)q}^3 \right)$$

with $$d_n^3$$

defined as $$d_n^3 = \underset{i = 0, 1, \dots, q-1, i \neq d_n, d_n^2}{\mathrm{argmax}} \{ |L_n(i)| \} \qquad (16)$$

Let us define the score function $G_n$ as:

$$G_n = \sum_{i=0}^{N-1} \sum_{j \in N(i)} f\left( M_{j \to i}(D_n), D_n(i), D_n^2(i), D_n^3(i) \right) \qquad (17)$$

here $f(m, x, x_2, x_3)$ is a function of $GF(q)^4$ to the real number that associate a value 1 if m=x, a value 0.9 if $m=x_2$, a value 0.8 if $m=x_3$, and 0 otherwise.

The remaining chip errors can be estimated as:

$$\hat{r} = \underset{r \in [\![-R, R]\!]}{\mathrm{argmax}} \{ G_{\hat{n}_0 + r} \} \qquad (18)$$

The values 1, 0.9, 0.8, and 0 have been determined through the following analysis. In case of correct synchronization (i.e. correct hypothesis r giving $n_0 = \tilde{n}_0 + r$ without any decision error in $D_{n_0}$), the output of the check nodes $M_{j \to i}(D_{n_0})$ will equal $D_{n_0}(i)$. If $D_{n_0}$ contains some errors, most probably the outputs of parity checks may have some elements in $$D_{n_0}^2,$$

and less probable in $$D_{n_0}^3.$$

In worst-case scenarios, the output is neither element of the three different vectors. It is worth noticing here that in the case of good synchronization and with no errors on the first decisions $D_{n_0}$, the output of the score function $G_{n_0}$ will be, $G_{n_0} = N \times 2$ (since $d_v = 2$).

FIG. 6 illustrates examples of $G_{\tilde{n}_0 + r}$ values as a function of r, by applying equation (18) over 4 independent received overmodulated frames affected by the chips errors $-3$, 0, 0 and 3, respectively.

After this chip synchronization process, the received QCSP frames (overmodulated frames) are perfectly synchronized.

Once the time synchronization step 45 has been completed (using the first step of the time synchronization algorithm, or the two steps of the time synchronization algorithm), classical steps of LLR computation 46 and NB decoding 47 can be implemented. Such steps are similar to the LLR computation 18 or NB-Code decoding step 19 illustrated in FIG. 1.

5.2.3 Simulation Results

Figures 7, 8:
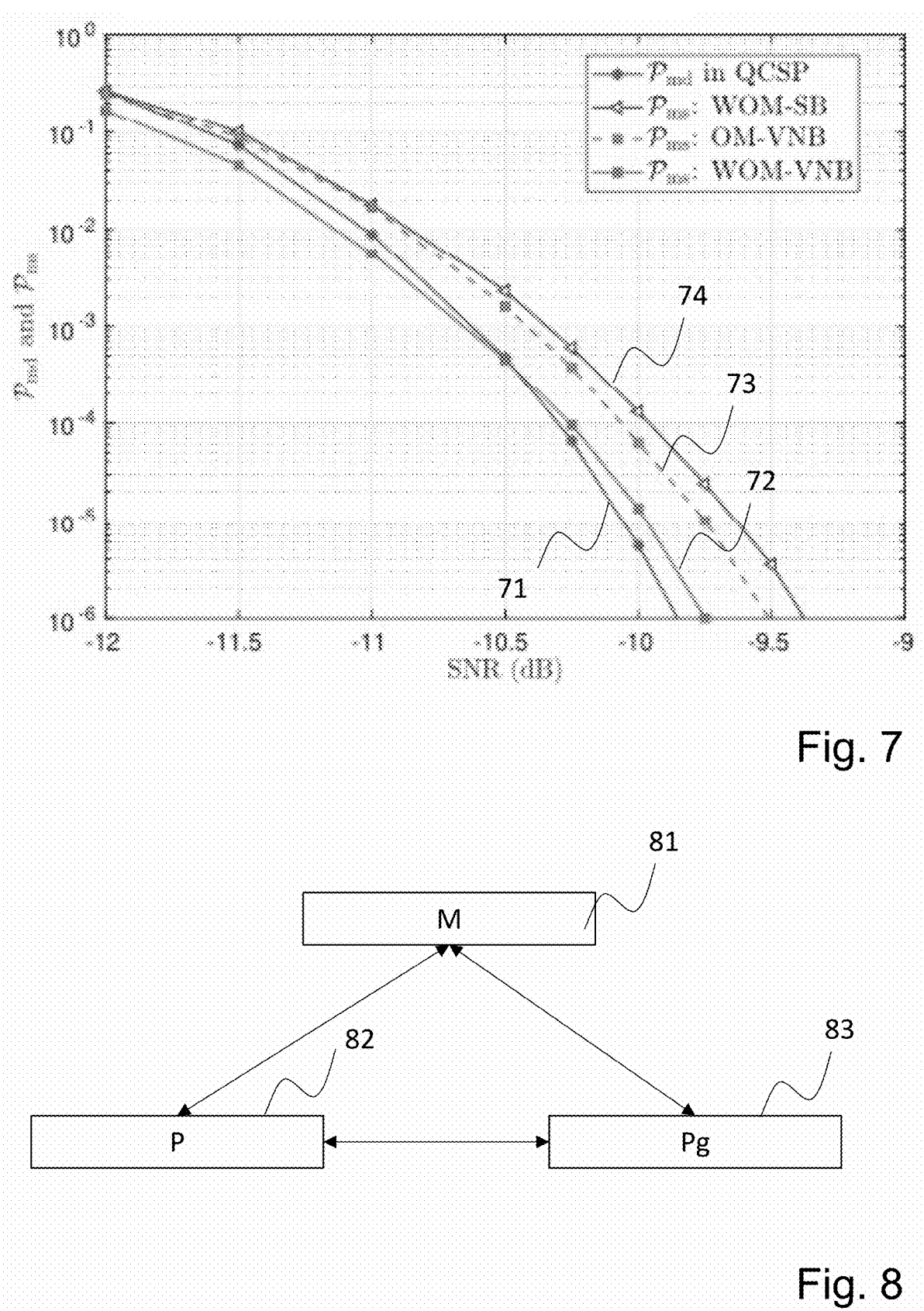
FIG. 7 illustrates simulation results when different embodiments of symbol synchronization and chip synchronization are implemented.
FIG. 8 shows the simplified structure of a transmitter for transmitting a signal according to one embodiment of the invention.

FIG. 7 illustrates simulation results when different embodiments of symbol synchronization (first embodiment called OverModulation OM or second embodiment called weighted OM WOM) and chip synchronization (first embodiment called Syndrome Based SB or second embodiment called Variable Node-Based VNB) are implemented.

The CCSK frame used for simulation is of size N=60 symbols over GF(64). The associate NB-LDPC code is a regular code of coding rate $R_c = 1/3$, with check node degree $d_c = 3$ and variable node degree $d_v = 2$, and time and frequency shifts considered to be uniform randomly distributed.

The Monte Carlo simulations were run over a AWGN channel with stopping criteria of 100 miss-detected or miss-synchronized frames.

Curve 71 shows the miss-detection probability $\mathcal{P}_{md}$ of the blind detection method as presented in previously cited document "Quasi Cyclic Short Packet for asynchronous preamble-less transmission in very low SNRs", where the time and frequency bins being considered are q/4 and $\pi/2$, with a probability of false alarm $P_{fa} = 10^{-6}$.

In order to compare the performance of the different algorithms, the second step is to feed the blind-synchronization block with the frames being successfully detected and then assess the synchronization performance. In this example, the frames being processed contain a residual frequency error bounded by $\pm 10^{-3}$.

Curve 72 shows the probability of miss-synchronization $\mathcal{P}_{ms}$ obtained using the WOM-VNB method (i.e. WOM for the symbol synchronization and VNB for the chip synchronization), where a gain of 0.25 dB is obtained with respect to the curve 73 representing the OM-VNB case (i.e. OM for the symbol synchronization and VNB for the chip synchronization). This gain shows the impact of the weighting technique in the OM method.

When comparing the WOM-VNB (curve 72) to WOM-SB (curve 74), a gain of 0.5 dB is noticed which shows the efficiency of the VNB technique as compared to the SB one.

According to at least one embodiment, the proposed algorithm thus enables to reach a probability of miss-synchronization $\mathcal{P}_{ms}$ of the order of $10^{-5}$ at very low SNR (−10 dB).

5.4 Structure

Finally, in relation to FIG. 8, the simplified structure of a transmitter according to at least one embodiment described above is presented.

Such a transmitter comprises at least one memory 81 comprising a buffer memory, at least one processing unit 82, equipped for example with a programmable computing machine or with a dedicated computing machine, for example a processor P, and controlled by the computer program 83, implementing steps of the method for transmitting a signal according to at least one embodiment of the invention.

Upon initialization, the code instructions of the computer program 83 are for example loaded into a RAM memory before being executed by the processor of the processing unit 82.

The processor of the processing unit 82 implements steps of the method for transmitting a signal described above, according to the instructions of the computer program 83, to:

generate at least one spread frame comprising N spread symbols, obtained by mapping N encoded symbols onto N cyclically shifted versions of a given base sequence, with N≥2, generate at least one overmodulated frame by modulating said at least one spread frame comprising N spread symbols by an overmodulation sequence of size N.

Figure 9:
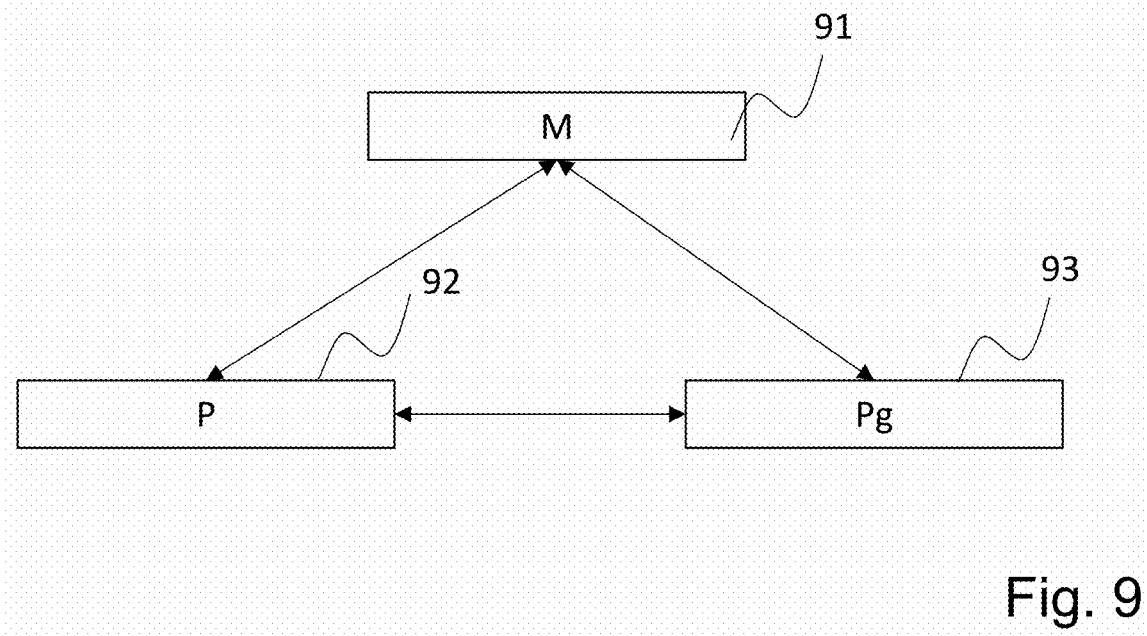
FIG. 9 shows the simplified structure of a receiver for receiving a signal according to one embodiment of the invention.

In relation to FIG. 9, the simplified structure of a receiver according to at least one embodiment described above is presented.

Such a receiver comprises at least one memory 91 comprising a buffer memory, at least one processing unit 92, equipped for example with a programmable computing machine or with a dedicated computing machine, for example a processor P, and controlled by the computer program 93, implementing steps of the method for receiving a signal according to at least one embodiment of the invention.

Upon initialization, the code instructions of the computer program 93 are for example loaded into a RAM memory before being executed by the processor of the processing unit 92.

The processor of the processing unit 92 implements steps of the method for receiving a signal described above, according to the instructions of the computer program 93, to:

receive at least one overmodulated frame, said at least one overmodulated frame being generated at the transmitter by modulating at least one spread frame, comprising N spread symbols, by an overmodulation sequence of size N, the N spread symbols of said at least one spread frame being obtained at the transmitter by mapping N encoded symbols onto N cyclically shifted versions of a given base sequence, with N≥2, determine a second estimate of a time of arrival at the receiver of said at least one spread frame, from a first estimate of said time of arrival and said overmodulation sequence.

APPENDIX 1

Both base sequence and overmodulation sequence could have good autocorrelation properties. In a specific embodiment, the base sequence and overmodulation sequence could be the same.

Examples of base sequences and overmodulation sequences are proposed below.

Other examples can be for example found for example in document "Performance analysis and simulation of cyclic code-shift keying" (C.-H. Kao, C. Robertson, and K. Lin, in Military Communications Conference, 2008 (MILCOM 2008. IEEE, nov. 2008, pp. 1-6) or in document "Cyclic code shift keying: a low probability of intercept communication technique" (G. M. Dillard, M. Reuter, J. Zeidler, and B. Zeidler, IEEETrans. Aerosp. Electron. Syst., vol. 39, no. 3, July 2003.)

Let q be the size of a pseudo noise base sequence $P_0$.

The auto-correlation vector is given as:

$$\theta(k) = \sum_{i=0}^{q-1} P_0(i)P_0(i+k),$$

where addition are done modulo q.

We define the $L_1$, $L_2$ and $L_{+\infty}$ norms of $\theta$ respectively as:

$$L_1(\theta) = \frac{1}{q}\sum_{k=1}^{q-1}|\theta(k)|$$

$$L_2(\theta) = \frac{1}{q}\sum_{k=1}^{q-1}\theta(k)^2$$

and $$L_{+\infty}(\theta)=\max(|\theta(k)|, k=1, \ldots, q-1).$$

Examples of base sequence $P_0$ are given below, according to criteria $L_2$ $P_0\_64 = [$
10001111101001101000100001001010011101110010001001111101
01000111
];
$P_0\_128 = [$
11111111001110101111011101101111011000000011100000010100
10110101010111010100101110000000001100101101100000110010
1110000011000110
];
$P_0\_256 = [$
01111010001011000010101111111111010000011110100100100000110
11111010010101110000011010100001010100010100110111011110
00101100111001000110110101011111110001000110100111010100111
01100111110100110110110101011000000110001000011000001000001
011011001111001110010001110000011
];

Examples of overmodulation sequences B of size 60 are given below:

---

B_1 = [
11110101000111000000001000101100110110000100110111000101
0010
]
B_2=[
11110101000111000000001000101100110110000100110111000101
0010
]

---

The invention claimed is:

1. A method implemented by a transmitter to transmit a signal to a receiver in a communication system, the method comprising:

generating at least one spread frame comprising N spread symbols, obtained by mapping N encoded symbols onto N cyclically shifted versions of a given base sequence, with N≥2;

generating at least one overmodulated frame by modulating said at least one spread frame comprising the N spread symbols by an overmodulation sequence of size N having specific auto-correlation properties, wherein the N spread symbols forming the spread frame are each modulated by an overmodulated symbol of the overmodulated sequence of size N, on a term-by term basis; and transmitting the signal comprising the at least one overmodulated frame in a communication system.

2. The method of claim 1, wherein generating the at least one spread frame implements a Cyclic Code Shift Keying modulation.

3. The method of claim 1, wherein said overmodulation sequence is:

$$B = [b_0, b_1, \ldots, b_{N-1}]$$

and said at least one overmodulated frame is:

$$F = \left[ b_0 \oplus P_{c_0}, b_1 \oplus P_{c_1}, \ldots, b_{N-1} \oplus P_{c_{N-1}} \right]$$

with:

$b_k \in \{0,1\}$, $[P_{c_0}, P_{c_1}, \ldots, P_{c_{N-1}}]$ the N spread symbols of said at least one spread frame and $\oplus$ the exclusive "or".

4. The method of claim 1, wherein said overmodulation sequence belongs to the group consisting of:

constant amplitude zero autocorrelation (CAZAC) sequence, a Barker sequence.

5. The method of claim 1, wherein said encoded symbols are non-binary symbols.

6. A non-transitory computer readable medium comprising a computer program stored thereon including instructions for implementing the method according to claim 1 when the program is executed by a processor of the transmitter.

7. A method implemented by a receiver to receive a signal transmitted by a transmitter in a communication system, the method comprising:

receiving at least one overmodulated frame in the communication system, said at least one overmodulated frame being generated at the transmitter by modulating at least one spread frame, comprising N spread symbols, by an overmodulation sequence of size N having specific auto-correlation properties, wherein the N spread symbols forming the spread frame are each modulated by an overmodulated symbol of the overmodulated sequence of size N, on a term-by term basis, the N spread symbols of said at least one spread frame being obtained at the transmitter by mapping N encoded symbols onto N cyclically shifted versions of a given base sequence, with N≥2; and determining a second estimate of a time of arrival at the receiver of said at least one spread frame, from a first estimate of said time of arrival and said overmodulation sequence.

8. The method of claim 7, wherein determining the second estimate of said time of arrival, denoted $\tilde{n}_0$, comprises determining an estimate of a symbol synchronization error, denoted $\tilde{s}$, such as:

$$\tilde{n}_0 = n_a + \tilde{s}T$$

with:

$n_a$ the first estimate of said time of arrival, and

T a time duration of the base sequence.

9. The method of claim 8, wherein the estimate s of the symbol synchronization error is determined as:

$$\tilde{s} = \operatorname*{argmax}_{s \in [-S, S]} \left\{ \max \left\{ \left| FFT\left( \Gamma_{n_a+sT} \odot B' \right) \right| \right\} \right\}$$

with:

B' a modulated version of the overmodulation sequence, $$\Gamma_n = (\gamma_n, \gamma_{n+q}, \gamma_{n+q(N-1)}),$$

$\gamma_n$ a correlation factor with the highest absolute value between the received spread symbol indexed n and a set of all possible cyclically shifted versions of the base sequence, and $0 < S \leq N/2$.

10. The method of claim 8, wherein the estimate s of the symbol synchronization error is determined as:

$$\tilde{s} = \operatorname*{argmax}_{s \in [-S, S]} \left\{ \max \left\{ \left| FFT\left( A_{n_a+sq} \odot \Gamma_{n_a+sT} \odot B' \right) \right| \right\} \right\}$$

with:

B' a modulated version of the overmodulation sequence, $\Gamma_n = (\gamma_n, \gamma_{n+q}, \gamma_{n+q(N-1)})$, $\gamma_n$ a correlation factor with the highest absolute value between the received spread symbol indexed n and a set of all possible cyclically shifted versions of the base sequence, $A_n = (a_n, a_{n+q}, a_{n+q(N-1)})$,
$\alpha_n$ a weighting factor, and
$0 < S \leq N/2$.

11. The method of claim 8, wherein determining the second estimate of said time of arrival further comprises determining an estimate of a chip synchronization error, denoted ř, wherein:

$$\hat{n}_0 = n_a + \check{s}T + \check{r}.$$

12. The method of claim 11, wherein said encoded symbols are non-binary symbols and wherein the estimate r of the chip synchronization error is determined from messages sent from at least one non-binary constraint node to a non-binary variable node in a step of decoding the encoded symbols.

13. A non-transitory computer readable medium comprising a computer program stored thereon including instructions for implementing the method according to claim 7 when the program is executed by a processor of the receiver.

14. A transmitter for transmitting a signal to a receiver in a communication system, the transmitter comprising:
at least one processor configured to:
generate at least one spread frame comprising N spread symbols, obtained by mapping N encoded symbols onto N cyclically shifted versions of a given base sequence, with N≥2;
generate at least one overmodulated frame by modulating said at least one spread frame comprising the N spread symbols by an overmodulation sequence of size N, having specific auto-correlation properties, wherein the N spread symbols forming the spread frame are each modulated by an overmodulated symbol of the over-modulated sequence of size N, on a term-by term basis; and
transmit the signal comprising the at least one overmodulated frame in a communication system.

15. A receiver for receiving a signal transmitted by a transmitter in a communication system, the receiver comprising:
at least one processor configured to:
receive at least one overmodulated frame in the communication system,
said at least one overmodulated frame being generated at the transmitter by modulating at least one spread frame, comprising N spread symbols, by an over-modulation sequence of size N having specific auto-correlation properties, wherein the N spread symbols forming the spread frame are each modulated by an overmodulated symbol of the overmodulated sequence of size N, on a term-by term basis; and
the N spread symbols of said at least one spread frame being obtained at the transmitter by mapping N encoded symbols onto N cyclically shifted versions of a given base sequence, with N≥2; and
determine a second estimate of a time of arrival at the receiver of said at least one spread frame, from a first estimate of said time of arrival and said overmodulation sequence.

* * * * *